April 8, 1958  W. R. MERCER  2,830,290
SINGLE SIDE BAND HORN SYSTEM
Filed June 25, 1956

INVENTOR.
William R. Mercer
BY
ATTORNEYS

2,830,290
SINGLE SIDE BAND HORN SYSTEM

William R. Mercer, Belmont, Mass., assignor, by mesne assignments, to the United States of America as represented by the Secretary of the Navy Application June 25, 1956, Serial No. 593,781

4 Claims. (Cl. 343—17.7)

This invention relates to radar systems wherein are provided means to simulate the operating conditions of a continuous wave system whereby the radar unit may be checked for accuracy without having actual targets as a basis for check measurements. The instant means provide an immediate check for loop sensitivity, speed search and lock, and up-down, right-left operation of a continuous wave radar.

The object of this invention therefore is a means for providing a check of a continuous wave radar eliminating an actual target use.

A secondary object of this invention is a system which simulates actual operating conditions and due to its simplicity is economical to manufacture, install and maintain.

Figure 1:
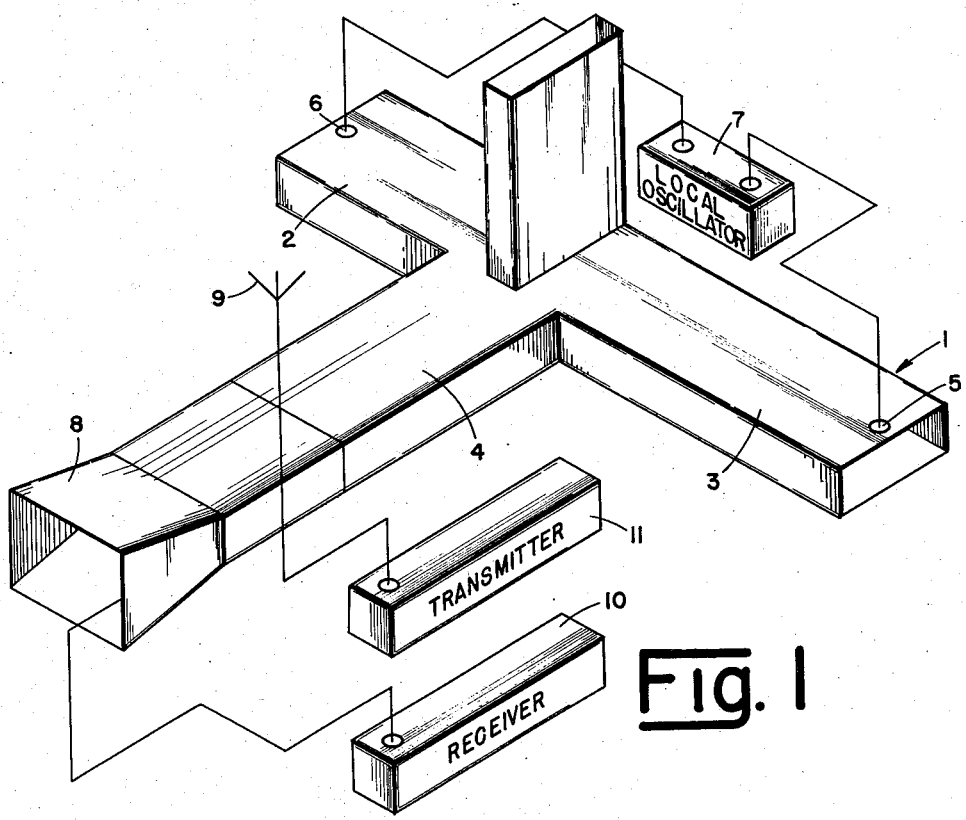

These and other objects will be readily apparent to those skilled in the art from an examination of the specification and attached drawings wherein:

Figure 1 schematically illustrates the instant invention, and

Figure 2:
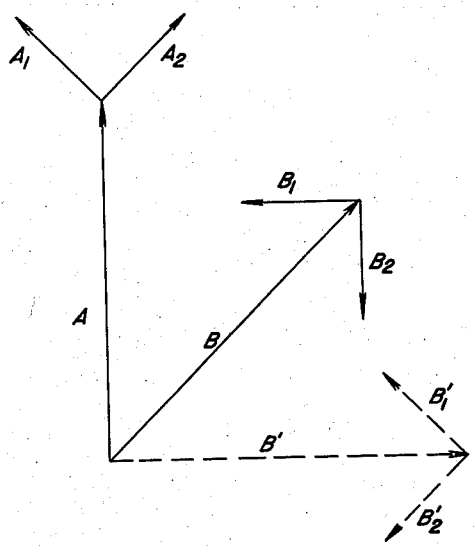

Figure 2 illustrates vectorially the energy waves in the magic "T."

Referring to Figure 1, the system consists of a horn 8 operatively connected to a magic "T" 1. Arm 2 of the "T" is made one-eighth wave length shorter than arm 3; such that if arm 2 is of a length equal to L, the arm 3 is of a length equal to $L$ plus $\lambda/8$. Each arm of the "T" contains a modulator crystal therein; crystal 5 is located in arm 3 while crystal 6 is located in arm 2.

A split phase oscillator 7 feeds a signal into each of the crystals with the two signals being 90 degrees out of phase with each other; the signal fed into the crystals is maintained within the Doppler band.

A transmitter 11 is operatively connected to an antenna 9 with the horn 8 placed within receiving range of the antenna.

In operation, the signal emitted from the antenna 9 is picked up by the horn 8, transmitted through arm 4 to the juncture of the "T" where its path is split; part of it travels to crystal 6 and the remaining portion to crystal 5. Vectorially the signal at crystal 6 is represented by vector A (Fig. 2) while the signal at crystal 5 is represented by vector B. Thus, since arm 3 is $\lambda/8$ longer than arm 2, vector B lags vector A by 45 degrees. The "Doppler" signals fed to the crystals 6 and 5 amplitude modulate the transmitted signals; thereby developing the usual sidebands ($A_1$, $A_2$, $B_1$, $B_2$ of Fig. 2). Sidebands $B_1$ and $B_2$ have an additional lag since there is a 90 degree phase difference at crystal 5 as compared to crystal 6.

On return, the amplitude modulated signal in arm 3 lags an additional 45 degrees due to the greater length of arm 3 as compared to arm 2. Assuming that the signal from crystal 6 is at the juncture and is again represented by vector A and sidebands $A_1$ and $A_2$, the signal from crystal 5 will lag the A signal by 90 degrees as represented by B'; this additional 45 degree lag will also of course be reflected in the sidebands $B_1'$ and $B_2'$.

The great difference in frequency between the transmitted signal and the Doppler signal permits the instantaneous phase evaluation that has been presented here.

It therefore becomes evident from an examination of Fig. 2 that at the center of the "T," sideband signals $A_1$ and $B_1'$ will add while sideband signals $A_2$ and $B_2'$ will cancel each other out. Horn 8 will therefore transmit a signal which is equivalent to a target reflected signal containing a Doppler component.

The illustration given above assumed that the horn and the antenna were in alignment; however, if the horn is positioned off boresight of the spinning antenna, modulation of the transmitted signal will occur at the spin rate as in the case of an actual target.

In the embodiment of the invention illustrated and explained, a single sideband transmission is employed in the horn because it permits tests to be conducted without dependence on critical spacing between the horn and the radar. In addition, double sideband transmission may also be used; in this case however, the phasing of the feed-through and horn reflected signals must be such that the two are either in phase or 180 degrees out of phase. Consequently, spacing between the radar and a double horn is critical; if improper phase relations exist, the crystal in the radar antenna will produce an undesirable complex wave, and up-down, right-left directional information riding in on the reflected signal as amplitude modulation will be distorted. Furthermore, factors such as magnetron frequency drift or pulling due to antenna spin tend to make proper spacing a difficult procedure.

Obviously many modifications and variations of the present invention are possible in the light of the above teachings. It is therefore to be understood that within the scope of the appended claims the invention may be practiced otherwise than as specifically described.

What is claimed is:

1. In a radar checking system, a radar transmitting unit including a spinning antenna, a radar receiver, a magic "T" with a horn attached to the stem of the "T" and placed in signal receiving relation to the antenna, the arms of the cross-bar of the "T" being of unequal length, a crystal at each end of the cross-bar, a split phase oscillator feeding a local signal to each crystal and means to interconnect the horn and receiver.

2. The system of claim 1 wherein the signals transmitted to the crystals by the split phase oscillator are 90 degrees out of phase with each other.

3. In a radar simulating system, a radar transmitter including a rotating antenna, a radar receiver, a magic "T" including a stem and a crossbar, a horn in operative relation to the stem of said magic "T," said horn being in receiving relation relative to said antenna, one arm of said crossbar of said magic "T" being one-eighth wave length longer than the other arm of said crossbar, means to operatively interconnect said receiver and horn, a crystal carried by said crossbar at each end thereof, and a split phase oscillator operatively associated with said crystals for feeding a signal into each of said crystals.

4. The system of claim 3 wherein the signal at one crystal is 90 degrees out of phase with the signal fed to the other crystal.

References Cited in the file of this patent

FOREIGN PATENTS 682,652     Great Britain _____ Nov. 12, 1952